United States Patent Office 2,850,500
Patented Sept. 2, 1958

2,850,500

1-[ARYL-(OXY-OR MERCAPTO)-(POLYCARBON-LOWER - ALKYL)]-4-ACYLOXY-4-ARYLPIPERI-DINES AND PREPARATION THEREOF

Bill Elpern, Albany, N. Y., assignor to Sterling Drug Inc., New York, N. Y., a corporation of Delaware No Drawing. Application April 2, 1956
Serial No. 575,322

13 Claims. (Cl. 260—294.3)

This invention relates to compositions of matter of the class of substituted piperidines and to processes for their preparation.

The invention here resides in the concept of a composition having a molecular configuration in which an aryl-Z-(polycarbon-lower-alkyl) radical where Z is O or S is attached to the nitrogen atom of the piperidine ring of 4-acyloxy-4-arylpiperidines and to processes for physically embodying such concept.

Attempts have been made for some time to develop analgesics having high activity. The highly potent morphine has the disadvantages of causing nausea, vomiting, constipation, and respiratory depression, and for these reasons has been supplanted largely by meperidine, ethyl 4-phenyl-1-methylpiperidine-4-carboxylate, especially in obstetrics where the depression of respiration is highly undesirable. Because of the relatively high dose required, meperidine has to be injected in hypertonic concentrations, with a consequent risk of irritation at the site of administration. This limits the choice of concentrations which can be used and restricts undesirably the free choice of optimum dosage. This situation is advantageously modified with the compounds of my invention since they are many times more potent as analgesics than meperidine and thus can be administered in smaller volumes of solution and at higher therapeutic levels of effectiveness without making the solution hypertonic. This reduces any tendency to undesirable accompanying irritation, and improves the therapeutic usefulness of the medicament.

U. S. Patent 2,167,351 broadly shows lower alkyl 4-aryl-1-(substituted)-piperidine-4-carboxylates where the 1-substituent is a monovalent hydrocarbon radical. Included among the specific examples are such compounds having 1-methyl and 1-benzyl substituents, the latter being of primary value as intermediates for the former. The 1-methyl compounds are now known and accepted as effective, morphine-like central analgesics and atropine-like smooth muscle neurospasmolytics in the relief of severe pain. An outstanding example of these 1-methyl compounds is the commercially available meperidine hydrochloride, ethyl 4-phenyl-1-methylpiperidine-4-carboxylate hydrochloride. On the other hand, the intermediate 1-benzyl compounds have been found to have a decidedly lower analgesic activity compared with the 1-methyl compounds. For example, ethyl 4-phenyl-1-benzylpiperidine-4-carboxylate as its hydrochloride has been found to be only approximately one-fourth as effective an analgesic as meperidine hydrochloride when tested intraperitoneally in rats by the Bass-Vander Brook modification of the D'Amour-Smith method [J. Am. Pharm. Assoc., Sci. Ed., 41, 569–570 (1952)]. This decrease in activity in going from 1-methyl to 1-benzyl would indicate that 1-aralkyl substituents are undesirable, and would thus lead investigators away from these compounds and away from compounds such as those of my invention.

Similarly, Randall and Lehmann [J. Pharm. & Exptl. Therap. 93, 314 (1948)] in a study of analgesic activity of a series of 1-substituted-4-acyloxy-4-arylpiperidines found a decrease in activity in going from 1-methyl to 1-benzyl compounds. In fact, these investigators reported 1 - benzyl-4-propanoyloxy-4-phenylpiperidine hydrochloride to have "only very weak analgesic effect."

I have now prepared 1-[aryl-Z-(polycarbon-lower-alkyl)]-4-acyloxy-4-phenylpiperidines where Z is O or S and found them to be outstandingly superior as analgesics compared with the corresponding 1-benzyl compounds as shown by Randall and Lehmann and, in fact, to be many times more effective than the commercial analgesic meperidine hydrochloride. For example, my 1-(3-phenoxypropyl)-4-acetoxy-4-phenylpiperidine as its hydrochloride salt when measured subcutaneously by the procedure mentioned above is approximately 180 times as potent an analgesic as meperidine hydrochloride, and when measured intraperitoneally by the same method is approximately 24 times as potent an analgesic as meperidine hydrochloride and approximately 16 times more potent than 1-benzyl-4-acetoxy-4-phenylpiperidine hydrochloride. In addition to this high analgesic activity, my compounds have a relatively low toxicity; for example, said 1-(3-phenoxypropyl)-4-acetoxy-4-phenylpiperidine hydrochloride is only about three times as toxic as meperidine hydrochloride when measured intravenously in mice by a procedure similar to that described by Hoppe et al., J. Pharm. & Exptl. Therap. 95, 502 (1949). Thus, the therapeutic index of 1-(3-phenoxypropyl)-4-acetoxy-4-phenylpiperidine hydrochloride is about 60 times that of meperidine hydrochloride by the subcutaneous route.

Various illustrations of the 4-acyloxy-4-aryl-1-piperidyl radical are known in the art and include such groupings wherein the 4-acyloxy substituent is lower alkanoyl, benzoyloxy, furoyloxy, acroyloxy, ethoxyacetoxy, succinoyloxy, and the like; and wherein the 4-aryl radical is phenyl, (lower alkoxylated)phenyl, (lower alkylated)phenyl, naphthyl, and the like. The piperidine ring can also bear one or more lower alkyl radicals on the available carbon atoms at positions 2, 3, 5 or 6, as shown in the art. Thus, my new compounds can be represented by the formula

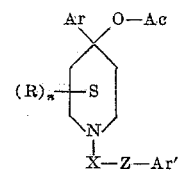

where Ar is an aryl radical of the benzene or naphthalene series, Ac is a lower carboxylic acyl radical, R is a lower alkyl radical, n is zero or an integer from 1 to 8, X is an alkylene radical having from two to six carbon atoms and having its free valence bonds on different carbon atoms, Z is O or S, and Ar' is an aryl radical of the benzene series.

The 4-aryl radical designated as Ar is an aryl group capable of forming an aryllithium or an arylmagnesium halide, and therefore can be phenyl or naphthyl or either of these bearing substituents unreactive to lithium or magnesium under the conditions of forming the aryllithium or arylmagnesium halide, such substituents preferably being lower alkyl and lower alkoxy groups. The number of such substituting groups can be up to five, preferably one to three, and where more than one can be the same or different and can be in any of the various position combinations relative to each other. The preferred substituents, lower alkyl and lower alkoxy, have preferably from one to six carbon atoms, including such substituents as: methyl, ethyl, n-propyl, isopropyl, n-butyl, isobutyl, 2-butyl, n-pentyl, isopentyl, n-hexyl, and the like, when lower alkyl; and methoxy, ethoxy, n-propoxy, isopropoxy, n-butoxy, isobutoxy, 2-butoxy, n-pentoxy, isopentoxy, n-hexoxy, and the like, when lower alkoxy.

The lower carboxylic acyl radical designated as Ac has preferably from two to seven carbon atoms and includes such radicals as alkanoyl, alkenoyl, alkoxyalkanoyl, carboxyalkanoyl, benzoyl, furoyl, and the like, and includes such examples as: ethanoyl (acetyl), propanoyl (propionyl), n-butanoyl, 2-methylpropanoyl, n-pentanoyl, n-hexanoyl, n-heptanoyl, and the like, when alkanoyl; 2-propenoyl, 2-methylpropenoyl, 2-butenoyl, and the like, when alkenoyl; methoxyacetyl, ethoxyacetyl, n-propoxyacetyl, 3-methoxypropanoyl, and the like, when alkoxyalkanoyl; 3-carboxypropanoyl, 4-carboxybutanoyl, and the like, when carboxyalkanoyl.

The 4-acyloxy-4-aryl-1-piperidyl radical designated above as

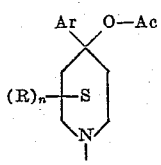

can be unsubstituted, as illustrated by the following formula (where $n$ is zero),

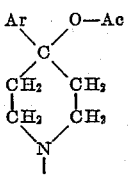

or can have up to 8, preferably 1 to 4, lower alkyl substituents, designated above as R, on the available carbon atoms at positions 2, 3, 5 or 6. R embraces lower alkyl radicals having from one to six carbon atoms, including such groups as: methyl, ethyl, n-propyl, isopropyl, n-butyl, isobutyl, 2-butyl, n-pentyl, n-hexyl, and the like.

The alkylene radical designated as X has from two to six carbon atoms and comprehends radicals such as $-CH_2CH_2-$, $-CH(CH_3)CH_2-$,

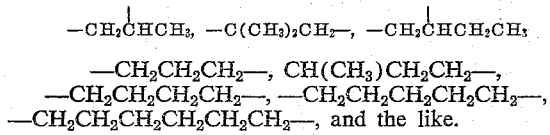

$-CH_2CH_2CH_2-$, $CH(CH_3)CH_2CH_2-$, $-CH_2CH_2CH_2CH_2-$, $-CH_2CH_2CH_2CH_2CH_2-$, $-CH_2CH_2CH_2CH_2CH_2CH_2-$, and the like.

The aryl radical designated above as Ar' is an aryl radical of the benzene series or, in other words, a monocarbocyclic aryl radical having six ring-carbon atoms. Thus, Ar comprehends the unsubstituted phenyl radical and phenyl radicals bearing up to five substituents, preferably one to three. Preferred substituents are lower alkyl and lower alkoxy radicals having preferably from one to six carbon atoms, and including such substituents as those given above for the lower alkyl and lower alkoxy substituents of the 4-aryl radical, Ar.

Preferred embodiments of my invention include compounds wherein the 4-aryl radical, Ar, is the phenyl radical, the 4-acyloxy radical, Ac, is a lower alkanoyl radical having two to six carbon atoms, and the aryl radical, Ar', of the 1-[aryl-Z-(polycarbon-lower-alkyl)] substituent is the phenyl radical. These preferred embodiments are the compounds having the formula

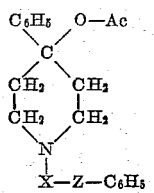

where Ac is an alkanoyl radical having from two to six carbon atoms, X is an alkylene radical having from two to six carbon atoms and having its free valence bonds on different carbon atoms, and Z is a member of the group consisting of O and S.

The 1-[aryl-Z-(polycarbon-lower-alkyl)]-4-acyloxy-4-arylpiperidines of my invention are prepared by reacting a 1-[aryl-Z-(polycarbon-lower-alkyl)]-4-piperidone with an aryllithium or arylmagnesium halide and acylating the resulting 1-substituted-4-hydroxy-4-arylpiperidine, preferably as its lithium or magnesium halide salt. This method is illustrated structurally as follows:

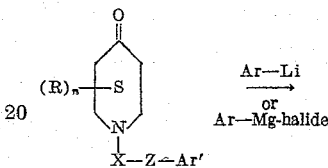

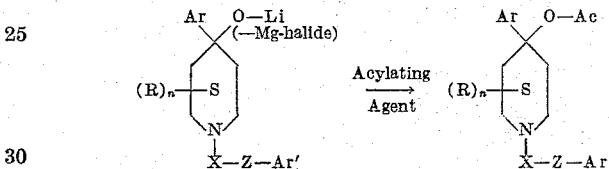

where R, $n$, X, Z, Ar' and Ar have the meanings given above. Reaction of the piperidone with an aryllithium or an arylmagnesium halide is carried out by heating the reactants in an inert medium, preferably a solvent mixture of ether and benzene. The resulting 1-[aryl-Z-(polycarbon-lower-alkyl)]-4-hydroxy-4-arylpiperidine, preferably as its lithium or magnesium halide salt, is reacted with an acylating agent, preferably by heating with an acyl anhydride of the formula $Ac_2O$ in an inert solvent such as benzene or toluene. Alternatively, but less satisfactory, the acylation can be carried out using an acyl halide (Ac-halogen) in an inert basic solvent such as pyridine. Also, alternatively but less satisfactory, the lithium salt can be hydrolyzed to the 1-substituted -4-hydroxy-4- arylpiperidine which, in turn, can be acylated. Illustrative of this procedure for the preparation of preferred embodiments is the reaction of 1-(3-phenoxypropyl)-4-piperidone or (1-(3-phenylmercaptopropyl)-4-piperidone with phenyllithium to yield the lithium salt of 1-(3-phenoxypropyl)-4-hydroxy-4-phenylpiperidine or 1-(3-phenylmercaptopropyl) - 4-hydroxy-4-phenylpiperidine, respectively, which is then reacted with propanoic (propionic) anhydride to produce 1-(3-phenoxypropyl)-4-propanoyloxy-4-phenylpiperidine or 1-(3-phenylmercaptopropyl)-4-propanoyloxy-4-phenylpiperidine, respectively.

The intermediate 1-[aryl-Z-(polycarbon-lower-alkyl)]-4-piperidones bearing no alkyl substituents on the 2, 3, 5 or 6 positions of the piperidone ring were prepared by reacting an aryloxyalkylamine or arylmercaptoalkylamine, $Ar'-Z-X-NH_2$, with at least two molar equivalents of a lower alkyl acrylate to yield an N,N-bis(carbalkoxyethyl)-N-(aryloxyalkyl or arylmercaptoalkyl)amine, heating this bis-ester with a strong basic condensing agent such as sodium or sodium hydride in an inert solvent medium such as benzene to form a 1-(aryloxyalkyl or arylmercaptoalkyl)-3-carbalkoxy-4-piperidone, and refluxing an acidic aqueous solution of the latter compound to effect hydrolysis and decarboxylation of the 3-carbalkoxy substituent to yield the intermediate 1-(aryloxyalkyl or arylmercaptoalkyl)-4-piperidone. This preparation is illustrated structurally as follows using methyl acrylate, a preferred reactant because of its low cost and ready availability:

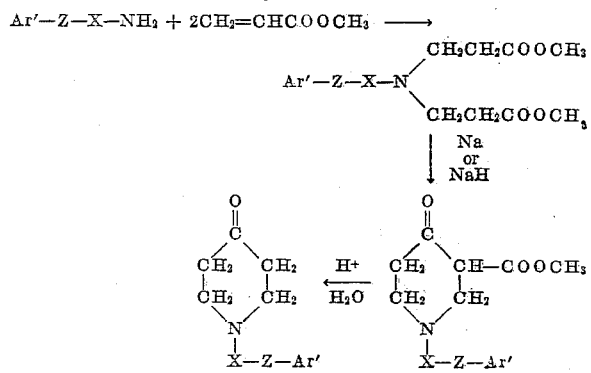

Other intermediate 1-(aryl-Z-alkyl)-4-piperidones bearing one to eight, preferably one to four, lower alkyl radicals as substituents of the piperidone ring at any of its available positions (2, 3, 5 or 6) can be prepared by the above procedure using other lower alkyl 2-alkenoates in place of methyl acrylate (methyl 2-propenoate) to produce symmetrically substituted piperidones, e. g., 1-(3-phenoxypropyl)-3,5-dimethyl-4-piperidone from 3-phenoxypropylamine and methyl menthacrylate (methyl 2-methyl-2-propenoate) or 1-(3-phenylmercaptopropyl)-2,6-dimethyl-4-piperidone from 3-phenylmercaptopropylamine and methyl crotonate (methyl 2-butenoate) or 1-(3-phenoxypropyl)-2,3,5,6-tetramethyl-4-piperidone from 3-phenoxypropylamine and methyl 2-methyl-2-butenoate; or by applying other known procedures of preparing 1-(lower alkyl or phenyl)-(alkylated)-4-piperidones to produce unsymmetrically or symmetrically alkylated 4-piperidones, e. g., such intermediates being 1-(3-phenoxypropyl)-3-methyl-4-piperidone [Howton, J. Org. Chem. 10, 277 (1945) prepared the corresponding 1-methyl compound], 1-(2-phenoxyethyl)-2,2,6-trimethyl-4-piperidone [Harries, Ann. 417, 166 (1918) prepared the corresponding 1-methyl compound], 1-(4-phenylmercaptobutyl)-3,5-di-n-propyl-4-piperidone [Mannich et al., Ber. 69B, 2299 (1936) prepared the corresponding 1-methyl compound], 1-(3-phenoxypropyl)-2,5-dimethyl-4-piperidone [Nazarov et al., Chem. Abstrs. 48, 1937 (1954) prepared the corresponding 1-phenyl compound].

My new 1-(aryloxyalkyl or arylmercaptoalkyl)-4-acyloxy-4-penylpiperidines are useful in the free base form or in the form of acid addition salts, and both forms are within the purview of the invention. The acids which can be used to prepare acid addition salts are preferably those which produce, when combined with the free base, salts whose anions are relatively innocuous to the animal organism in therapeutic doses of the salts, so that the beneficial physiological properties inherent in the free base are not vitiated by side effects ascribable to the anions. In practicing my invention, I found it convenient to employ the hydrochloride salt. However, other appropriate acid addition salts are those derived from mineral acids such as hydrobromic acid, hydriodic acid, nitric acid, phosphoric acid and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate or acid phosphate, sulfate or acid sulfate, acetate, citrate or acid citrate, tartrate or acid tartrate, lactate, quinate, methanesulfonate and ethanesulfonate salts, respectively.

The following examples will further illustrate the invention without, however, limiting it thereto.

EXAMPLE 1

A. *1-(aryloxyalkyl)-4-piperidones*

The preparation of these compounds is illustrated by the following synthesis of 1-(3-phenoxypropyl)-4-piperidone: 3-phenoxypropylamine (38 g.) was dissolved in 50 ml. of methanol, the solution cooled in an ice bath and 65 g. of methyl acrylate was added slowly while maintaining the internal temperature below 10° C. The reaction mixture was then allowed to stand at room temperature for thirteen days. Alternatively, this reaction can be carried out by refluxing the reaction mixture for about 5 to 8 hours, using preferably three moles of methyl acrylate per mole 3-phenoxypropylamine. The reaction solution was then concentrated by heating in vacuo on a steam bath to remove the methanol and excess methyl acrylate, yielding 72 g. of a residual oily material. A small sample of this material was distilled in vacuo to give the purified product, N,N-bis(2-carbomethoxyethyl)-3-phenoxypropylamine, which boiled at 164–170° C. at 10.2 mm. The main portion of this intermediate bis-ester was not distilled due to a tendency to decompose but rather was used directly in the cyclization procedure given below. The distilled sample was submitted for analysis.

*Analysis.*—Calcd. for $C_{17}H_{25}NO_5$: C, 63.14; H, 7.79; N, 4.33. Found: C, 62.44; H, 7.73; N, 4.29.

To a stirred mixture containing 8.9 g. of sodium hydride suspended in 350 ml. of dry benzene was added dropwise 53 g. of N,N-bis(2-carbomethoxyethyl)-3-phenoxypropylamine. The addition required about one hour, and heating at reflux with stirring was continued for an additional one and one-half hours. The reaction mixture was then cooled in an ice bath, 50 ml. of water was added dropwise followed by a solution of 50 ml. of concentrated hydrochloric acid in 100 ml. of water. The mixture was poured through a separatory funnel and the heavier acid layer was separated. The benzene layer was washed with hydrochloric acid solution containing 50 ml. of water and 25 ml. of concentrated hydrochloric acid, and then with 50 ml. of water. These washings were combined with the acidic layer and the resulting solution was refluxed for two hours. The reaction mixture was then allowed to stand overnight and was made alkaline with excess 35% aqueous sodium hydroxide solution with cooling. The product that separated was extracted with benzene; the benzene extract was dried over anhydrous sodium sulfate; and the benzene was removed by distilling in vacuo. The vacuum distillation of the residual material yielded 11 g. of the product, 1-(3-phenoxypropyl)-4-piperidone which boiled at 136–137° C. at 10.2 mm.

The above procedure can also be carried out to yield the same product using an equivalent amount of sodium in place of sodium hydride.

Following the above procedure used for the preparation of 1-(3-phenoxypropyl)-4-piperidone but using the appropriate phenoxyalkylamine in place of 3-phenoxypropylamine, there is obtained the following compounds: 1-(2-phenoxyethyl)-4-piperidone using 2-phenoxyethylamine; 1-(4-phenoxybutyl)-4-piperidone using 4-phenoxybutylamine; 1-(2-phenoxypropyl)-4-piperidone using 2-phenoxypropylamine; 1-(5-phenoxypentyl)-4-piperidone using 5-phenoxypentylamine; 1-(6-phenoxyhexyl)-4-piperidone using 6-phenoxyhexylamine; and the like.

Other 1-(aryloxyalkyl)-4-piperidones bearing one or more lower alkyl radicals at the 2, 3, 5 or 6 positions of the piperidone ring can be prepared following the above procedure for the preparation of 1-(3-phenoxypropyl)-4-acetoxy-4-phenyl-piperidine but using other lower alkyl 2-alkenoates in place of methyl acrylate or following procedures described in the literature for the preparation of corresponding 1-methyl(or phenyl)-(alkylated)-4-piperidones. For example, following the above procedure but using methyl methacrylate (methyl 2-methyl-2-propenoate), methyl crotonate (methyl 2-butenoate) or methyl 2-methyl-2-butenoate in place of methyl acrylate, there is obtained 1-(3-phenoxypropyl)-3,5-dimethy-4-piperidone, 1-(3-phenoxypropyl)-2,6-dimethyl-4-piperidone or 1 - (3-phenoxypropyl)-2,3,5,6-tetramethyl-4-piperidone, respectively. Following the procedure described by Howton, ibid., for the preparation of 1,3-dimethyl-4-piperidone using 3-phenoxypropylamine in place of methylamine, 1-(3-phenoxypropyl)-3-methyl-4-piperidone is obtained; or following the procedure of Harries, ibid., for the preparation of 1,2,2,6-tetramethyl-4-piperidone using 2-phenoxyethylamine in place of methylamine, 1 - (2-phenoxyethyl)-2,2,6-trimethyl-4-piperidone is obtained; or following the procedure of Mannich et al., ibid., for the preparation of 1-methyl-3,5-di-n-propyl-4-piperidone using 4-phenoxybutylamine in place of methylamine, 1-(4-phenoxybutyl)-3,5-di-n-propyl-4-piperidone is obtained; or following the procedure of Nazarov et al., ibid., for the preparation of 1-phenyl-2,5-dimethyl-4-piperidone using 3-phenoxypropylamine in place of aniline, 1-(3-phenoxypropyl)-2,5-dimethyl-4-piperidone is obtained.

Other 1-(aryloxyalkyl)-4-piperidones can be prepared following the above procedure for the preparation of 1-(3-phenoxypropyl)-4-piperidone using other aryloxyalkylamines in place of 3-phenoxypropylamine, as follows: 1-[2-(3-methylphenoxy)ethyl]-4-piperidone using 2-(3-methylphenoxy)ethylamine; 1 - [2 - (2,4-diethylphenoxy)ethyl]-4-piperidone using 2-(2,4-diethylphenoxy)ethylamine; 1-[3-(2,4,6-trimethylphenoxy)-propyl]-4-piperidone using 3-(2,4,6-trimethylphenoxy)propylamine; 1-[2-(3-n-butylphenoxy)ethyl]-4-piperidone using 2-(3-n-butylphenoxy)ethylamine; 1-[2-(4 - n - hexylphenoxy)-ethyl]-4-piperidone using 2 - (4 - n - hexylphenoxy)ethylamine; 1-[3-(4-n-butoxyphenoxy)propyl] - 4 - piperidone using 3-(4-n-butoxyphenoxy)-propylamine; 1-[2-(3,4,5-trimethoxyphenoxy)ethyl]-4-piperidone using 2-(3,4,5-trimethoxyphenoxy)ethylamine; 1 - [3-(3,4-diethoxyphenoxy)propyl]-4-piperidone using 3 - (3,4 - diethoxyphenoxy)propylamine; 1-[2-(4-n-hexoxyphenoxy)ethyl] - 4 - piperidone using 2-(4-n-hexoxyphenoxy)ethylamine; 1-[3-(2-methoxy-4 - isopropylphenoxy)propyl] - 4 - piperidone using 3-(2-methoxy - 4 - isopropylphenoxy)propylamine; and the like.

B. *1-(aryloxyalkyl)-4-acyloxy-4-phenylpiperidines*

The preparation of these compounds is illustrated by the following synthesis of 1-(3-phenoxypropyl)-4-acetoxy-4-phenylpiperidine: Phenyllithium was prepared from 6.2 ml. of bromobenzene and 0.77 g. of lithium wire in a solution containing 75 ml. of ether and 10 ml. of benzene. The phenyllithium solution (alternatively, a solution of phenylmagnesium bromide can be used here) was cooled to about 10° C. and a solution of 8 g. of 1-(3-phenoxypropyl)-4-piperidone in 75 ml. of dry benzene was added with stirring over a period of about fifteen minutes. The mixture was refluxed for ninety minutes to yield a solution of 1-(3-phenoxypropyl)-4-hydroxy-4-phenylpiperidine as its lithium salt. This solution was cooled to about 10° C., a solution of 13.2 ml. of acetic anhydride in 30 ml. of dry benzene was added over a period of about ten minutes, and the resulting reaction mixture was refluxed for one hour. The reaction mixture was then cooled to 10° C., and 50 ml. of water was added dropwise with stirring followed by 10 ml. of concentrated hydrochloric acid. The resulting solid was collected, washed with water and then benzene, and recrystallized from ethanol to yield about 8 g. of product, which was purified further by suspending it in 50 ml. of water and treating the solution with excess 35% sodium hydroxide solution. The liberated product, 1-(3-phenoxypropyl)-4-acetoxy-4-phenylpiperidine in the form of its free base, was taken up in benzene. The benzene solution was washed twice with water, dried over anhydrous sodium sulfate, filtered and concentrated in vacuo. The residual oily material was dissolved in 50 ml. of isopropanol and acidified by the dropwise addition of concentrated hydrochloric acid. The solid product crystallized immediately. The mixture was cooled in an ice bath; and the solid was then collected, washed with a little acetone, and dried at 60° C. for eighteen hours. There was thus obtained 2.2 g. of 1-(3-phenoxypropyl)-4-acetoxy-4-phenylpiperidine as its hydrochloride, M. P. 196.4–197.4° C. (corr.).

*Analysis.*—Calcd. for $C_{22}H_{27}NO_3 \cdot HCl$: C, 67.77; H, 7.24; Cl, 9.09. Found: C, 67.86; H, 7.22; Cl, 8.87.

1-(3-phenoxypropyl)-4-acetoxy - 4 - phenylpiperidine is obtained in its free base form by dissolving the hydrochloride salt in water, treating the aqueous solution with sodium hydroxide solution, extracting the liberated basic product with benzene, drying the benzene extract over anhydrous sodium sulfate, and removing the benzene by distilling in vacuo.

Following the above procedure but using phenylmagnesium bromide in place of phenyllithium or using acetyl chloride in place of acetic anhydride as the acetylating agent, the same product is obtained.

Additional 1-(3-phenoxypropyl) - 4 - alkanoyloxy - 4 - phenylpiperidines are obtained following the above procedure but using other alkanoic anhydrides in place of acetic anhydride; for example, using propanoic anhydride, n-butanoic anhydride, 2-methylpropanoic anhydride, n-pentanoic anhydride or n-hexanoic anhydride, there are obtained 1-(3-phenoxypropyl)-4-propanoyloxy-4-phenylpiperidine, 1-(3-phenoxypropyl)-4-n - butanoyloxy-4-phenylpiperidine, 1 - (3 - phenoxypropyl) - 4 - (2 - methylpropanoyloxy)-4-phenylpiperidine, 1-(3-phenoxypropyl)-4-n-pentanoyloxy-4-phenylpiperidine or 1 - (3 - phenoxypropyl)-4-n-hexanoyloxy-4-phenylpiperidine, respectively. Following the same procedure but using 1-(2-phenoxyethyl)-4-piperidone, 1-(4-phenoxybutyl)-4-piperidone, 1-(2-phenoxypropyl)-4-piperidone, 1-(5-phenoxypentyl)-4-piperidone or 1-(6-phenoxyhexyl)-4-piperidone in place of 1-(3-phenoxypropyl)-4-piperidone and acetic anhydride as the acylating agent, there is obtained 1-(2-phenoxyethyl)-4-acetoxy-4-phenylpiperidine, 1 - (4 - phenoxybutyl)-4-acetoxy-4-phenylpiperidine, 1 - (2 - phenoxypropyl)-4-acetoxy-4-phenylpiperidine, 1-(5-phenoxypentyl)-4-acetoxy-4-phenylpiperidine or 1-(6-phenoxyhexyl)-4-acetoxy-4-phenylpiperidine, respectively. These products can be isolated in their free base form or in the form of their acid addition salts, preferably the hydrochlorides.

Pharmacological evaluation of 1-(3-phenoxypropyl)-4-acetoxy-4-phenylpiperidine hydrochloride in aqueous solution administered subcutaneously by the Rat Thermal Stimulus Method of Bass and Vander Brook, ibid., has shown that this compound is approximately 180 times as potent an analgestic as ethyl 4-phenyl-1-methylpiperidine-4-carboxylate hydrochloride. This compound was found to have an acute toxicity of 12±1 mg. per kg. in mice and of 4.9±0.4 mg. per kg. in rats when administered intravenously in aqueous solution.

Other 1-(phenoxyalkyl)-4-acyloxy-4-phenylpiperidines that are obtained following the above procedure for the preparation of 1-(3-phenoxypropyl)-4-acetoxy-4-phenylpiperidine using the appropriate 1-(phenoxyalkyl)-4-piperidone and acylating agent are: 1-(3-phenoxypropyl)-3,5-dimethyl-4-acetoxy-4-phenylpiperidine using 1-(3-phenoxypropyl)-3,5-dimethyl-4-piperidone and acetic anhydride; 1-(3-phenoxypropyl)-2,6-dimethyl-4 - acetoxy - 4 - phenylpiperidine using 1 - (3 - phenoxypropyl) - 2,6 - dimethyl-4-piperidone and acetic anhydride; 1-(3-phenoxypropyl)-2,3,5,6-tetramethyl-4 - acetoxy - 4 - phenylpiperidine using 1-(3-phenoxypropyl)-2,3,5,6-tetramethyl-4-piperidone and acetic anhydride; 1-(3-phenoxypropyl)-3-methyl-4-propanoyloxy-4-phenylpiperidine using 1-(3-phenoxypropyl)-3-methyl-4-piperidone and propanoic anhydride; 1-(2-phenoxyethyl)-2,2,6-trimethyl-4-n-butanoyloxy-4-phenylpiperidine using 1-(2-phenoxyethyl)-2,2,6-trimethyl-4-piperidone and n-butanoic anhydride; 1-(4-phenoxybutyl)-3,5-di-n-propyl-4-acetoxy-4 - phenylpiperidine using 1-(4-phenoxybutyl)-3,5-di-n-propyl-4-piperidone and acetic anhydride; and 1-(3-phenoxypropyl)-2,5-dimethyl-4-propanoyloxy-4-phenylpiperidine using 1-(3- phenoxypropyl)-2,5-dimethyl-4-piperidone and propanoic anhydride. These compounds can be isolated in their free base form or in the form of their acid addition salts, preferably the hydrochlorides.

Other 1 - (aryloxyalkyl) - 4 - acyloxy - 4 - arylpiperidines that are obtained following the above procedure for the preparation of 1-(3-phenoxypropyl)-4-acetoxy-4-phenylpiperidine using the appropriate 1-(aryloxyalkyl)-4-piperidone, aryllithium and acylating agent are: 1-[2-(3-methylphenoxy)ethyl] - 4 - acetoxy - 4 - (3 - methylphenyl)piperidine using 1-[2-(3-methylphenoxy)ethyl]-4 - piperidone, 3 - methylphenyllithium and acetic anhydride; 1 - [2 - (2,4 - diethylphenoxy)ethyl] - 4 - ethoxyacetoxy - 4(4 - ethoxyphenyl)piperidine using 1 - [2 - (2,4 - diethylphenoxy)ethyl] - 4 - piperidone, 4 - ethoxyphenyllithium and ethoxyacetic anhydride; 1-[3-(2,4,6-trimethylphenoxy)propyl] - 4 - (3 - carboxypropanoyl)-4 - phenylpiperidine using 1 - [3 - (2,4,6 - trimethylphenoxy)propyl]-4-piperidone, phenyllithium and succinic anhydride; 1 - [2 - (3 - n - butylphenoxy)ethyl] - 4 - propanoyloxy - 4 - (2,4,6 - trimethylphenyl)piperidine using 1 - [2 - (3 - n - butylphenoxy)ethyl] - 4 - piperidone, 2,4,6-trimethylphenyllithium and propanoic anhydride; 1-[2 - (4 - n - hexylphenoxy)ethyl] - 4 - benzoyloxy - 4-(3,4 - dimethoxyphenyl)piperidine using 1 - [2 - (4 - n - hexylphenoxy)ethyl] - 4 - piperidone, 3,4 - dimethoxyphenyllithium and benzoyl chloride; 1 - [3 - (4 - n - butoxyphenoxy)propyl] - 4 - (2 - propenoyloxy) - 4 - (2,6-di-n-propylphenyl)piperidine using 1-[3-(4-n-butoxyphenoxy)propyl] - 4 - piperidone, 2,6 - di - n - propylphenyllithium and 2-propenoic anhydride; 1-[2-(3,4,5-trimethoxyphenoxy)ethyl] - 4 - acetoxy - 4 - (4 - n - hexoxyphenyl)piperidine using 1 - [2 - (3,4,5 - trimethoxyphenoxy)ethyl] - 4 piperidone, 4 - n - hexoxyphenyllithium and acetic anhydride; 1-[3-(3,4-diethoxyphenoxy)-propyl] - 4 - furoyloxy - 4 - (4 - n - butylphenyl)piperidine using 1 - [3 - (3,4 - diethoxyphenoxy)propyl] - 4 - piperidone, 4 - n - butylphenyllithium and furoic acid chloride; 1 - [2 - (4 - n - hexoxyphenoxy)ethyl] - 4 - n-propanoyloxy - 4 - (1 - naphthyl)piperidine using 1 - [2-(4 - n - hexoxyphenoxy)ethyl] - 4 piperidone, 1 - naphthyllithium and n-propaonic anhydride; 1-[3-(2-methoxy-4 - isopropylphenoxy)propyl] - 4 - acetoxy - 4 - (2-naphthyl)piperidine using 1 - [3 - (2 - methoxy - 4 - isopropylphenoxy)propyl] - 4 - piperidone, 2 - naphthyllithium and acetic anhydride; 1 - (3 - phenoxypropyl) - 4 - propanoyloxy - 4 - (4 - methyl - 6 - ethoxy - 1 - naphthyl)piperidine using 1 - (3 - phenoxypropyl) - 4 - piperidone, 4 - methyl - 6 - ethoxy - 1 - naphthyllithium and propaonic anhydride; 1 - (2 - phenoxyethyl) - 4 - acetoxy - 4 - (2,4,6 - triethoxyphenyl)piperidine using 1 - (2 - phenoxyethyl) - 4 - piperidone, 2,4,6 - triethoxyphenyllithium and acetic anyhydride.

EXAMPLE 2

A. 1-(arylmercaptoalkyl)-4-piperidones

The preparation of these compounds is illustrated by the preparation of 1-(3-phenylmercaptopropyl)-4-piperidone which is obtained following the procedure described above in Example 1A for the preparation of the corresponding 1-(3-phenoxypropyl)-4-piperidone, using 3-phenylmercaptopropylamine in place of 3-phenoxypropylamine.

Other 1-(arylmercaptoalkyl)-4-piperidones that can be prepared following the above procedure for the preparation of 1-(3-phenylmercaptopropyl)-4-piperidone using the appropriate arylmercaptoalkylamines are: 1-(2-phenylmercaptoethyl)-4-piperidone using 2-phenylmercaptoethylamine; 1 - [3 - (4 - n - butoxyphenylmercapto)propyl] - 4 - piperidone using 3 - (4 - n - butoxyphenylmercapto)proylamine; 1 - [4 - (3,4 - diethoxyphenylmercapto)butyl] - 4 - piperidone using 4 - (3,4 - diethoxyphenylmercapto)butylamine; 1 - [6 - (2,4,6 - trimethylphenylmercapto)hexyl] - 4 - piperidone using 6 - (2,4,6-trimethylphenylmercapto)hexylamine; and the like.

B. 1-(arylmercaptoalkyl)-4-acyloxy-4-arylpiperidines

The preparation of these compounds is illustrated by the synthesis of 1-(3-phenylmercaptopropyl)-4-acetoxy-4-phenylpiperidine following the procedure given hereinabove in Example 1B for the preparation of the corresponding 1-(3-phenoxypropyl) compound using 1-(3-phenylmercaptopropyl)-4-piperidone in place of 1-(3-phenoxypropyl)-4-piperidone. The resulting product can be isolated in free base form or in the form of its hydrochloride addition salt.

Other 1 - (arylmercapto) - 4 - acyloxy - 4 - arylpiperidines that can be prepared following the above procedure for the preparation of 1-(3-phenylmercaptopropyl)-4-acetoxy-4-phenylpiperidine using the appropriate 1-(arylmercaptoalkyl)-4-piperidone, aryllithium and acylating agent are: 1-(2-phenylmercaptoethyl)-4-propanoyloxy-4-(3 - methylphenyl)piperidine using 1 - (2 - phenylmercaptoethyl) - 4 - piperidone, 3 - methylphenyllithium and propaonic anhydride; 1 - [3 - (4 - n - butoxyphenylmercapto)propyl - 4 - n - butanoyloxy - (3,4 - dimethoxyphenyl)piperidine using 1 - [3 - (4 - n - butoxyphenylmercapto)propyl] - 4 - piperidone, 3,4 - dimethoxyphenyllithium and n-butanoic anyhydride; 1-[4-(3,4-diethoxyphenylmercapto)butyl] - 4 - acetoxy - 4 - (4 - n - hexylphenyl)piperidine using 1-[4-(3,4-diethoxyphenylmercapto)butyl] - 4 piperidone; 4 - n - hexylphenyllithium and acetic anhydride; 1 - [6 - (2,4,6-trimethylphenylmercapto)hexyl] - 4 - propanoyloxy - 4 phenylpiperidine using 1 - [6 - (2,4,6 - trimethylphenylmercapto)hexyl]-4-piperdone using phenyllithium and propanoic anhydride; and the like. These compounds can be isolated in their free base form or in the form of their acid addition salts, preferably the hydrochlorides.

The chemical structure of my 1-[aryl-Z-(polycarbon-lower - alkyl)] - 4 - acyloxy - 4 - arylpiperidines is established by the mode of synthesis and corroborated by the correspondence of calculated and found values for the elementary analyses for representative examples.

My 1 - [aryl - Z - (polycarbon - lower - alkyl)] - 4-acyloxy-4-arylpiperidines can be formulated in the manner conventional for potent analgesics, e. g., in liquid preparations in an aqueous or aqueous-ethanol menstruum, or in solid form, e. g., as tablets or powders. The tablet formulations can be prepared using conventional excipients; and the powders can be dispensed in capsule form. These preparations can be administered orally or, in the case of the aqueous preparations, intramuscularly or intravenously.

I claim:

1. A composition of matter selected from the group consisting of: (a) 4-(lower-carboxylic-acyloxy)-4-arylpiperidines having as a substituent in the 1-position a radical selected from the class consisting of aryloxy-(lower alkyl) and arylmercapto-(lower alkyl) radicals; and, (b) acid addition salts thereof.

2. 1-[phenoxy-(lower alkyl)]-4-(lower alkanoyloxy)-4-phenylpiperidines.

3. An acid addition salt of the compound claimed in claim 2.

4. A 1-(phenoxyalkyl)-4-alkanoyloxy - 4 - phenylpiperidine having the formula

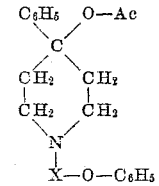

where Ac is an alkanoyl radical having from two to six carbon atoms and X is an alkylene radical having from two to six carbon atoms and having its free valence bonds on different on different carbon atoms.

5. An acid addition salt of the compound claimed in claim 4.

6. A 1-(3-phenoxypropyl)-4-alkanoyloxy - 4 - phenylpiperidine having the formula

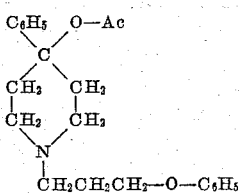

where Ac is an alkanoyl radical having from two to six carbon atoms.

7. An acid addition salt of the compound claimed in claim 6.

8. 1-(3-phenoxypropyl)-4-acetoxy - 4 - phenylpiperidine.

9. 1-(3-phenoxypropyl) - 4 - acetoxy - 4 - phenylpiperidine hydrochloride.

10. A process for the preparation of 1-[aryl-Z-(lower alkyl)]-4-(lower-carboxylic-acyloxy) - 4 - arylpiperidine where Z is a member of the group consisting of O and S, which comprises: reacting 1-[aryl-Z-(lower alkyl)]-4-piperidone with a compound selected from the group consisting of an aryllithium and an arylmagnesium halide; and reacting the resulting 1-[aryl-Z-(lower alkyl)]-4- hydroxy-4-arylpiperidone with a lower-carboxylic-acylating agent.

11. A process for the preparation of a 1-(phenoxyalkyl)-4-alkanoyloxy - 4 - phenylpiperidine having the formula

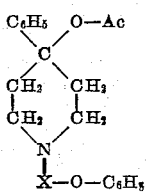

where Ac is an alkanoyl radical having from two to six carbon atoms and X is an alkylene radical having from two to six carbon atoms and having its free valence bonds on different carbon atoms, which comprises: reacting a 1-(phenoxyalkyl)-4-piperidone with phenyllithium; and reacting the resulting 1-(phenoxyalkyl) - 4 - hydroxy-4-phenylpiperidine as its lithium salt with a lower alkanoic anhydride.

12. A process for the preparation of a 1-(3-phenoxypropyl)-4-alkanoyloxy - 4 - phenylpiperidine having the

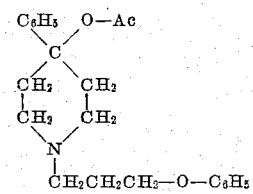

where Ac is an alkanoyl radical having from two to six carbon atoms, which comprises: reacting 1-(3-phenoxypropyl)-4-piperidone with phenyllithium; and reacting the resulting 1-(3-phenoxypropyl)-4-hydroxy-4-phenylpiperidine as its lithium salt with a lower alkanoic anhydride.

13. A process for the preparation of 1-(3-phenoxypropyl)-4-acetoxy-4-phenylpiperidine which comprises: reacting 1-(3-phenoxypropyl)-4-piperidone with phenyllithium; and reacting the resulting 1-(3-phenoxypropyl)-4-hydroxy-4-phenylpiperidine as its lithium salt with acetic anhydride.

References Cited in the file of this patent

UNITED STATES PATENTS 2,498,432    Lee _____ Feb. 21, 1950

OTHER REFERENCES

Randall et al.: Journal of Pharmacology and Experimental Therapy, vol. 93, pp. 314–328 (1948).

UNITED STATES PATENT OFFICE
CERTIFICATE OF CORRECTION

Patent No. 2,850,500                                                   September 2, 1958

Bill Elpern

It is hereby certified that error appears in the printed specification of the above numbered patent requiring correction and that the said Letters Patent should read as corrected below.

Column 4, lines 29 and 30, extreme right-hand portion of the formula, for "$\overset{|}{X}$-Z-Ar" read -- $\overset{|}{X}$-Z-Ar' --; column 5, line 46, for "1937" read -- 1357 --; column 6, line 58, for "oxybuylamine;" read -- oxybutylamine; --; line 75, for "-dimethy-4-" read -- -dimethyl-4- --; column 10, line 20, for "propaonic" read -- propanoic --; lines 20 and 21, for "-butoxyphenylmercapto)propyl -4-" read -- -butoxyphenylmercapto)propyl] -4- --; line 73, strike out "on different", first occurrence; column 12, line 10, for "having the" read -- having the formula --.

Signed and sealed this 14th day of April 1959.

(SEAL)
Attest:
KARL H. AXLINE
Attesting Officer

ROBERT C. WATSON
                                                        Commissioner of Patents